INVENTOR
Horst Ohnsorge

BY Spencer & Kaye

ATTORNEYS

United States Patent Office 3,317,669
Patented May 2, 1967

3,317,669

METHOD AND APPARATUS FOR INCREASING RELIABILITY OF SYNC SIGNAL TRANSMISSION

Horst Ohnsorge, Ulm (Danube), Germany, assignor to Telefunken Patentverwertungs-G.m.b.H., Ulm (Danube), Germany Filed Oct. 15, 1964, Ser. No. 404,111
Claims priority, application Germany, Oct. 15, 1963, T 24,892
6 Claims. (Cl. 178—69.5)

The present invention relates to a method and apparatus for transmitting data in which the information is transmitted in individual blocks whose respective starts are identified by synchronizing blocks, each constituted by a plurality of individual signals which appear at the receiving side of the transmission system prior to the start of a new block.

In present day data transmission systems, the information has to be broken up into individual blocks, the reason for this being that the reliability and accuracy of the transmission has to be tested periodically by means of test signals which are transmitted at the end of such an information block. This, however, makes it necessary that some determination be made at the receiving end of the system as to when a new information block is being transmitted, and this is conventionally done by sending out and receiving so-called synchronizing signals prior to the start of each block.

While it would, theoretically, be sufficient if such synchronizing signal were constituted by a single pulse or the like, experience has shown that such a transmission system is susceptible to errors inasmuch as a single marker signal which is intended to identify the start of a block might be generated spuriously, so that there is no guarantee that the start of each information block would be recognized as such at the receiving end. It is for this reason that the synchronizing signals are generally constituted by a plurality or so-called block of individual signals all of which have to be identified at the receiving side in order to trigger the signal which marks the beginning of the information block. This, in turn, brings with it the likelihood that the synchronizing signals themselves will be subject to faults, the reason being that the more individual signals make up a synchronizing block, the greater the probability that one of the individual pulses will be faulted. Thus, heretofore conventional equipment represents a compromise insofar as the number of synchronizing signals within an over-all synchronizing block is concerned, in that, on the one hand, the number of individual signals within a synchronizing block should be made as large as possible so as to reduce the likelihood of the spurious generation of a synchronizing signal, and, on the other hand, the number of individual signals should not be too great in order to reduce the probability of fault in any one of the symbols. In other words, for one reason it is desired to have as many individual signals as possible while for another reason it is desirable to have as few individual signals as possible.

It is therefore, the primary object of the present invention to provide a data transmission system which overcomes the above drawbacks, namely, a system in which there is a very low degree of probability that a synchronizing signal will be randomly or spuriously generated, while, at the same time, the synchronizing signal transmission is as error proof as possible.

With the above object in view, the present invention resides mainly in a transmission method and apparatus in which the synchronizing blocks are divided into at least two groups of individual signals, and that when one such group is identified at the receiver end of the transmission system, a start signal for processing incoming information is triggered, after a time interval which corresponds to the time interval which the group is spaced from the start of the information block, i.e., after the elapse of a time interval corresponding to that which the particular group that has been identified is known to be spaced from the start of the particular information block which the synchronizing block of which the group in question is a part, precedes.

According to a further feature of the present invention, at least one of the synchronizing signals is common to more than one group.

According to another feature of the present invention, the probability that a signal B will be triggered as the result of a spurious identification of a group of synchronizing signals can be reduced even further by requiring not only one group to be identified at the receiver end but by requiring that two or more groups be identified correctly. This can be done by dividing the synchronizing signals into more than two groups, and then not producing the signal which provides the indication of the start of a block of information signals until at least two groups are correctly identified. The identification can be coupled with a suitable program stored at the receiving end, where the number, timing and even the sequence of the individual starting signals are taken into consideration, such that at least certain criteria are fulfilled before the actual start signal is triggered.

Additional objects and advantages of the present invention will become apparent upon consideration of the following description when taken in conjunction with the accompanying drawings in which.

Figure 1:
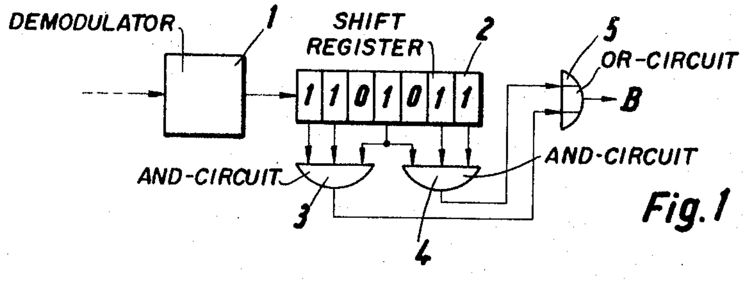
FIGURE 1 is a block circuit diagram of one embodiment of the present invention.

Referring now to the drawings, and to FIGURE 1 thereof in particular, the same shows the circuitry at the receiver side of a transmission system according to the present invention. The circuit includes a demodulator 1 which receives the incoming signals, the output of the demodulator 1 being applied serially to a multiple-element shift register 2. Here, the sequence of the entire synchronizing signal 1101011 is divided into two groups, the middle 1 being common to the two groups. The first, second, fourth, sixth and seventh shift register elements are connected to two AND-circuits 3 and 4, as shown in FIGURE 1, the outputs of these two AND-circuits being connected to the two inputs of an OR-circuit 5. Thus, a signal B, representing the start of a block, will appear at the output of the OR-circuit 5 whenever either the first group 1101 or the second 1011 or both were correctly identified. Here, the shift register 2, which receives the incoming signals serially, serves to delay the signals by the proper amount, so that a signal B will appear at the same correct instant, irrespective of whether it was triggered by a signal from AND-circuit 3 or by a signal from AND-circuit 4, or if each of the two AND-circuits 3, 4 passed a signal to OR-circuit 5.

Figure 2:
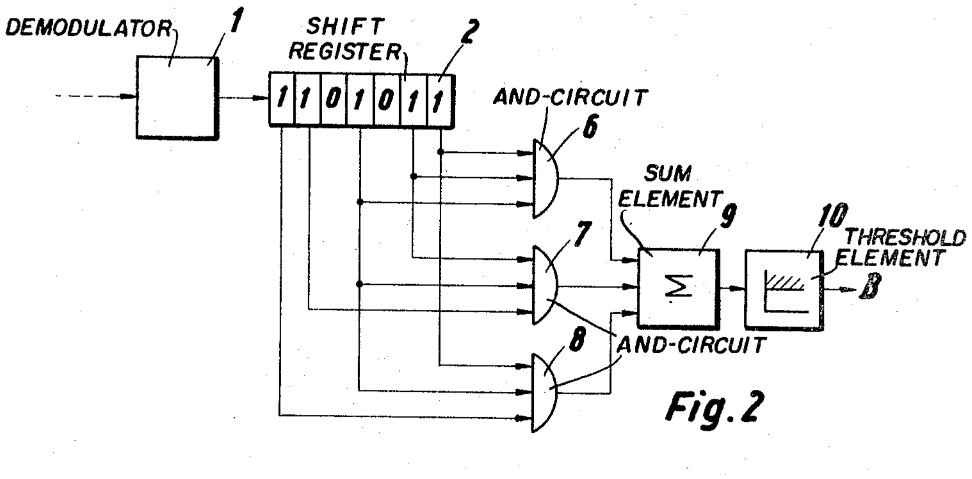
FIGURE 2 is a block circuit diagram of another embodiment of a circuit according to the present invention.

FIGURE 2 shows a circuit diagram of an arrangement which is even more resistant to spurious synchronization signals, i.e., a circuit arrangement which allows the transmission system to operate with an even higher degree of reliability. Here, the demodulator 1 is again connected to a shift register 2. The synchronizing signal sequence is divided into three groups, the first, second, fourth, sixth and seventh elements, however, now being connected to more than two, e.g., to three AND-circuits 6, 7 and 8, as shown in FIGURE 2. The outputs of the AND-circuits are connected to a sum element 9 whose output in turn, is connected to a threshold element 10. The output signal B representing the start of an information block then appears only whenever the sum of the AND-circuit signals exceeds a predetermined threshold, e.g., 2, which means that the signal B appears only if at least two out of the three AND-circuits 6, 7, 8, have passed a signal to the sum element 9, showing that at least two out of the three groups were correctly identified.

Figure 3:
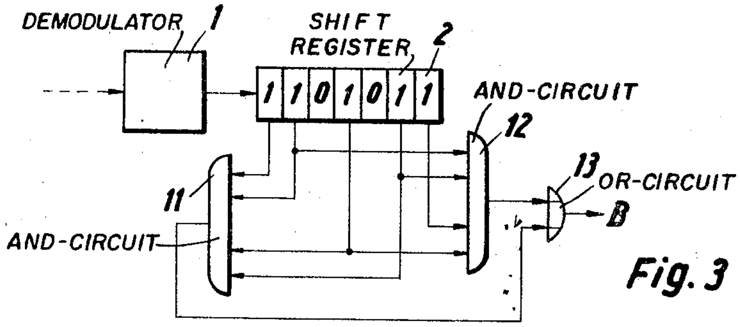
FIGURE 3 is a block circuit diagram of yet another embodiment of the present invention.

In certain cases it is desirable to select individual signals pertaining to different groups of the synchronizing block. Such a circuit is shown in FIGURE 3, in which the shift register elements of the shift register 2, to which the signals are applied serially from the demodulator 1, are connected to selected inputs of the AND-circuits 11 and 12. The arrangement in FIGURE 3 differs from that of FIGURE 1 in that there are three individual signals which are common to both groups. The outputs of AND-circuits 11 and 12 are connected to the two inputs of an OR-circuit 13 which produces the output signal B, again representing the start of an information block, when either one of the two groups, or both, have been correctly received and identified.

It will be seen from the above that, thanks to the present invention, as described in conjunction with FIGURES 1 and 3, the receiving end of the transmission will have applied to it a number of preliminary signals corresponding in number to the number of groups of synchronizing signals, each of which by itself can trigger the signal which marks the start of an information block. Thus, it is enough if at least one of these groups is correctly received.

As also explained above, the susceptibility to faults can be decreased even further by letting one or more individual signals be common to more than one group. Thus, if, as explained above, the synchronizing block is constituted by the sequence 1101011, this block is split up into two groups having the center 1 in common. If it is the sequence 1101 which is identified, the starting signal B will be triggered after a time delay corresponding to three individual signals has elapsed. If additionally, or only, the second group, namely, 1011, is identified at the receiver end, the signal B will be triggered immediately prior to the start of the information block, that is to say, there will be no time delay involved. In general, then, if the synchronizing block is divided into *m* groups of individual signals, there will appear—if all groups are properly identified—*m* starting signals each of which shows that an information block is about to follow, all of which starting signals will, actually, appear simultaneously.

It will also be seen from the above that the arrangement of FIGURE 2 differs from that of FIGURES 1 and 3 in that more than one group is needed to trigger the starting signal. In the simplest case, the synchronizing block is divided into three groups, and the identification of any two of them will be required to trigger the signal B. In practice, the synchronizing block may, for example, be divided into five groups, and the threshold may be three, i.e., the identification of three groups will be needed to produce the signal B. Thus, the systems shown in FIGURES 1, 2 and 3 all have in common the fact that the synchronizing signals of each block are divided into a plurality of groups, and that the signal B which provides the indication of the start of a block of information signals is produced when less than all of the groups are identified.

It will be understood that the above description of the present invention is susceptible to various modifications, changes, and adaptations, and the same are intended to be comprehended within the meaning and range of equivalents of the appended claims. Especially the method of the invention is applicable to a data transmission system in which blocks of information signals are sent in equidistant time intervals. In this case it is only necessary to send a synchronizing signal at the beginning of the transmission or before a repetition of a disturbed data-block.

Furthermore such a synchronizing signal can be utilized not only for the identification of the start of data blocks, but also as a signal for the transmission of only yes-or-no-decisions.

What is claimed is:

1. In a method of transmitting, from a transmitting end to a receiving end, data composed of blocks of information signals each of which blocks is preceded by a block of synchronizing signals, said method comprising the steps of:

(a) dividing, at the receiver end, the synchronizing signals of each block into at least two groups, at least one of said synchronizing signals being common to each of two succeeding groups, each of which groups itself precedes the information block identified by the respective synchronizing block by a given time interval; and (b) identifying each group for producing a signal which provides an indication of the start of a block of information signals, after the elapse of a time interval corresponding to that by which the particular group identified is known to be spaced from the information block preceded by that synchronizing block of which the identified group is a part.

2. The method defined in claim 1 wherein each of a plurality of synchronizing signals is common to a plurality of groups.

3. In a transmission system for transmitting, from a transmitter end to a receiver end, data composed of blocks of information signals each of which blocks is preceded by a block of synchronizing signals, the combination which comprises:

(a) means located at the receiver end and including a multiple-element shift register connected to receive incoming synchronizing signals serially, and a plurality of AND-circuits each having inputs connected to respective ones of said register elements, with one of said register elements being connected to a plurality of said AND-circuits for identifying, within each block of synchronizing signals, at least two groups of synchronizing signals; and (b) means including an OR-circuit connected to the outputs of said AND-circuits for producing a signal which indicates the start of a block of information signals, upon the identification of at least one group of synchronizing signals and after the elapse of a time interval corresponding to that which the particular group identified is known to be spaced from the information block which the synchronizing block of which the identified group is a part precedes.

4. The combination as defined in claim 3 wherein each of a plurality of said register elements is connected to a plurality of said AND-circuits.

5. In a method of transmitting, from a transmitting end to a receiving end, data composed of blocks of information signals each of which blocks is preceded by a block of synchronizing signals, said method comprising the steps of dividing, at the receiver end, the synchronizing signals of each block into a plurality of groups, at least one of said synchronizing signals being common to each of at least two of said groups, and producing a signal which provides an indication of the start of a block of information signals when less than all of said plurality of groups are identified.

6. In a transmission system for transmitting, from a transmitter end to a receiver end, data composed of blocks of information signals each of which blocks is preceded by a block of synchronizing signals, the combination which comprises:

(a) means located at the receiver end and including a multiple element shift register connected to receive incoming synchronizing signals serially, and at least three AND-circuits each having inputs connected to respective ones of the elements of said shift register for identifying, within each block of synchronizing signals, more than two groups of shynchronizing signals; and (b) means including a sum circuit connected to receive the outputs of said AND-circuits, and a threshold element connected to receive the output of said sum-circuit for producing a signal which indicates the start of a block of information signals upon the identification of at least two groups of synchronizing signals and after the elapse of a time interval corresponding to that by which the particular group identified is known to be spaced from the information block which is preceded by that synchronizing block of which the identified group is a part.

References Cited by the Examiner

UNITED STATES PATENTS 3,201,515 8/1965 Meisingset ---------- 178—53

DAVID G. REDINBAUGH, *Primary Examiner.*

J. McHUGH, R. L. RICHARDSON, *Assistant Examiners.*